United States Patent [19]

De Rooy et al.

[11] 3,859,278

[45] Jan. 7, 1975

[54] PROCESS FOR SEPARATING LACTAMS

[75] Inventors: Abraham H. De Rooy, Geleen; Reijer Goettsch, Beek, both of Netherlands

[73] Assignee: Stamicarbon B. V., Geleen, Netherlands

[22] Filed: Aug. 1, 1973

[21] Appl. No.: 384,747

Related U.S. Application Data

[63] Continuation-in-part of Ser. No. 313,638, Dec. 11, 1972.

[52] U.S. Cl. .................. 260/239.3 A, 260/293.86, 260/326.5 FN
[51] Int. Cl. ............................................. C07d 41/06
[58] Field of Search ........... 260/239.3 A, 293.86, 260/326.5 FN

[56] References Cited
UNITED STATES PATENTS

| | | | |
|---|---|---|---|
| 2,249,177 | 7/1941 | Schlack | 260/239.3 A |
| 2,351,381 | 6/1944 | Wiest | 260/239.3 A |
| 2,723,266 | 11/1955 | Lincoln et al. | 260/239.3 A |
| 2,737,511 | 3/1956 | Cohn | 260/239.3 A |
| 2,993,889 | 7/1961 | Muytjens | 260/239.3 A |
| 3,336,298 | 8/1967 | De Rooij | 260/239.3 A |

*Primary Examiner*—John D. Randolph
*Assistant Examiner*—Robert T. Bond
*Attorney, Agent, or Firm*—Cushman, Darby & Cushman

[57] ABSTRACT

Lactams are recovered from a solution of one or more lactams and sulfuric acid in an organic solvent after neutralization with ammonia or an ammonium salt and water without the simultaneous coproduction of solid ammonium sulfate according to the disclosed process. Ammonium hydrogen sulfate produced in the neutralization step is removed in the solution form, preferably concentrated to about 80 per cent by weight and the lactam is recovered from the organic solvent. Removing the ammonium hydrogen sulfate in the solution form rather than a solid avoids crystallization and deposition of the salt onto the surfaces of processing equipment.

3 Claims, 1 Drawing Figure

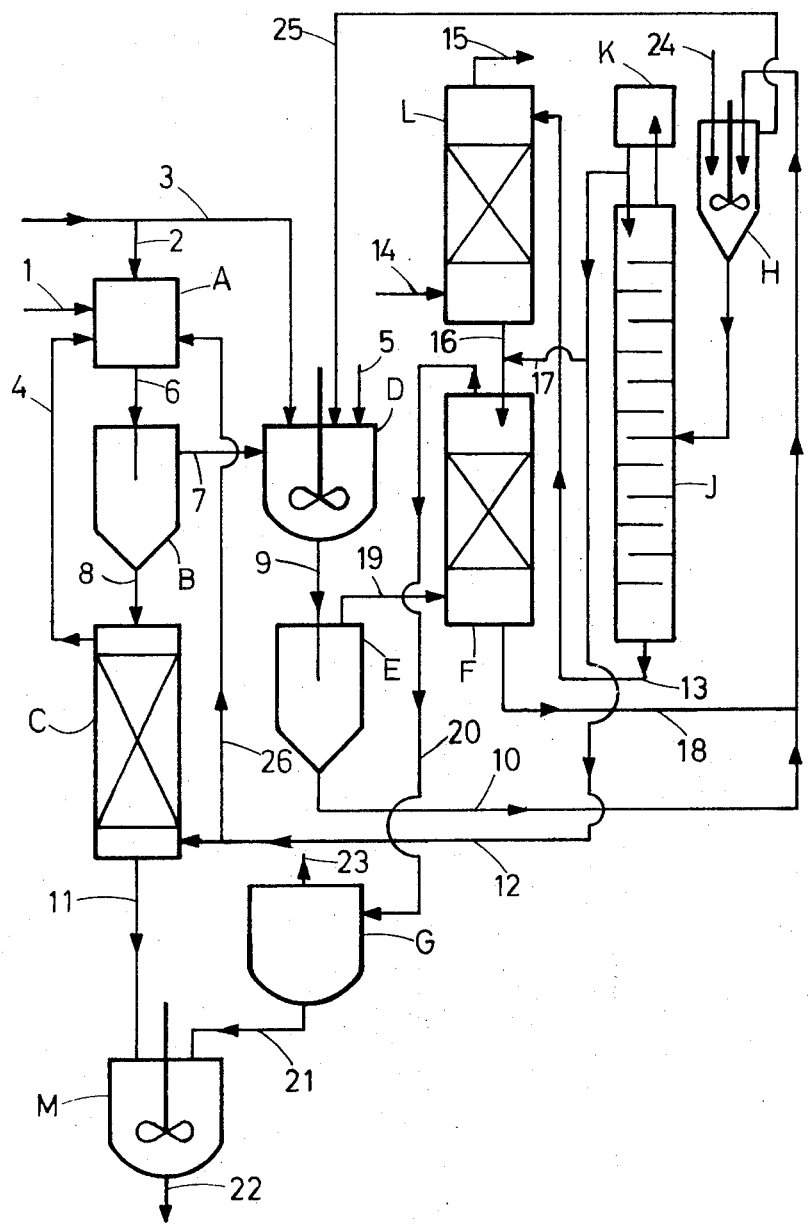

PROCESS FOR SEPARATING LACTAMS

CROSS-REFERENCE TO RELATED APPLICATIONS

This application is a continuation-in-part of our earlier application Ser. No. 313,638, filed Dec. 11, 1972, and entitled: Process for Recovery of Lactam.

BACKGROUND OF THE INVENTION

This invention relates to the separation and recovery of lactams, particularly ε-caprolactam, from a sulfuric acid containing reaction medium obtained by conversion of the corresponding oximes. On a commercial scale such lactams are produced from alicyclic oximes by an intermolecular rearrangement known as the Beckmann rearrangement, the reaction taking place and is in fact catalyzed in a highly acid medium. Generally such rearrangement reactions are conducted in the presence of oleum at a concentration of about 6% by weight.

The present application describes an improvement upon the invention disclosed in our earlier, copending application Ser. No. 313,638, filed on Dec. 11, 1972, mentioned above. To the extent necessary to understand and appreciate the present invention the disclosure thereof is hereby incorporated by reference.

The process of our prior application involves (a) neutralizing the sulfuric acid in the reaction mixture at a temperature of at least about 110°C and in the presence of an inert organic solvent for the lactam. The sulfuric acid is neutralized with ammonia, ammonium sulfate, and/or dry ammonium hydrogen sulfate to ammonium hydrogen sulfate, which is obtained as a melt. The lactam (b) dissolves in the organic solvent, and the lactam containing organic solvent is (c) separated, by simple phase separation, from the ammonium hydrogen sulfate melt. The lactam-containing organic solvent also contains free sulfuric acid, and this free sulfuric acid is (d) neutralized to convert the free sulfuric acid to solid ammonium sulfate or triammonium hydrogen sulfate. These solid ammonium salts are separated from the solution and the salts so separated may be used to neutralize the sulfuric acid in the lactam-containing starting mixture. The lactam can be (e) separated from the organic solvent by distillation or extraction. The solvent which has been substantially freed of lactam and sulfuric acid may in turn be used to (f) extract any lactam remaining in the ammonium hydrogen sulfate melt, thereby producing, in addition to the lactam, a discharge of a substantially lactam-free melt of ammonium hydrogen sulfate, which in turn may be subjected to conventional recovery treatment and $SO_3$ or $SO_2$ are thus recovered. The lactam is separated as a crude lactam solution and is ready for further purification.

Our prior procedure has many advantages, but is primarily characterized in that no ammonium sulfate, an undesirable by-product, is produced. As stated in our earlier application ammonium sulfate is no longer a commercially attractive product and processes which produce large amounts of this byproduct are made more costly by disposal of this material. Rather than ammonium sulfate there is obtained an ammonium-hydrogen-sulfate melt, and this by-product is conveniently converted and discharged as a gas mixture of $N_2$, $H_2O$ and $SO_2$ according to conventional procedures. Indeed the gas mixture itself may again be used for the preparation of the required amount of oleum needed for the oxime to lactam conversion reaction.

DETAILED DESCRIPTION OF THE INVENTION

It has been our experience, however, that our earlier process presents difficulties in separating the solid salt from the suspension of the salt crystals in the solution of lactam in the organic solvent. Usually a chlorinated hydrocarbon, such as chloroform, 1,2-dichloroethane or 1,1,2,2-tetrachloroethane is used. The salt-lactam solvent suspension is obtained in the step after neutralization of the free sulfuric acid. While we are not certain of the reason or reasons for this salt separation difficulties, presumably it is due to the great difference in polarity between the salt and the organic solvent, in which case very fine crystals are formed which immediately deposit onto the walls of the equipment, so that physical separation of these fine crystals by means of a filtering device is seriously encumbered.

The present invention overcomes the above-mentioned difficulties in separation of the solid ammonium salts in that, rather than forming solid salts, an ammonium hydrogen sulfate salt solution is formed. This solution is formed when the free sulfuric acid in the lactam containing organic solvent is neutralized and water is added in addition to the neutralizing agent (ammonia, ammonium sulfate and triammonium hydrogen sulfate). The resulting solution is conveniently and easily separated from the lactam-containing solution due to the difference in specific gravity. The ammonium hydrogen sulfate solution so recovered is then discharged preferably after water evaporation therefrom to a salt content of about 80 % by weight or even higher. Rather than adding water as such in addition to the neutralizing agent it is also possible to add somewhat dilute condensates containing small or minor amounts of sulfuric acid which are e.g. obtained as by-product streams in the conventional manufacture of sulfuric acid and oleum from a gas flow containing $SO_2$ and water vapor. Generally the amount of sulfuric acid or acid content will not exceed 10 % by weight. The term "oleum" is used in this specification in its usual meaning as indicating a solution of sulfuric trioxide in concentrated (97–99%) sulfuric acid, commonly known as fuming sulfuric acid.

The present invention will be further described as regards the nature of the process in general terms, that is the recovery of lactam using an organic solvent without the coproduction of ammonium sulfate, such as reactants, their nature and identity, molar proportions thereof, reaction parameters and the like.

In the step of neutralizing the sulfuric acid and/or sulfur trioxide present in the rearrangement mixture, it is not necessary to exactly neutralize these materials to ammonium hydrogen sulfate. In other words, the molar ratio does not have to correspond exactly to the formula: $\alpha = (NH_4)_2SO_4/[(NH_4)_2SO_4 + H_2SO_4] = 0.5/1$. Relatively small deviations from this molar ratio are possible, and the lactam will generally be extracted from a melt wherein the molar ratio $\eta$ varies from 0.40:1 to 0.55:1. As used hereinafter, the term "ammonium hydrogen sulfate melt" refers to melts not only having a molar ratio of $\eta = 0.5:1$, but also those compounds wherein the molar ratio varies from a lower limit of $\eta = 0.40:1$ to an upper limit of 0.55:1.

In order for the mass to be kept in a molten condition during the neutralization of the sulfuric acid and/or sullayer consisting of the organic solvent laden with lactam and sulfuric acid. We have found that, if an ammonium hydrogen sulfate melt is to be discharged, the organic solvent retains about one-third of the original amount of sulfuric acid.

The lower layer flows through conduit 8 into an extraction column C, where the melt is extracted with solvent fed in counter-current through conduit 12 and discharged through conduit 4. An ammoniium-hydrogen-sulfate melt freed of lactam is discharged through conduit 11 for further processing. The upper layer formed in separator B is passed through conduit 7 into a neutralizing vessel D, where the sulfuric acid is changed into ammonium hydrogen sulfate with a neutralizing agent [$NH_3$, $(NH_4)_2SO_4$ or $(NH_4)_3H(SO_4)_2$] fed in through conduit 3. In addition, enough water, either as such or in the form of a dilute condensate containing sulfuric acid, is fed in through conduit 5 to keep the resulting $NH_4HSO_4$ in solution.

An emulsion of the solution of ammonium hydrogen sulfate in water and the solution of lactam in the organic solvent flows through conduit 9 into liquid-liquid separator E.

The amount of lactam-laden solution discharged from separator E flows through conduit 10 and a neutralizing vessel H, where the residual dissolved sulfuric acid is neutralized to ammonium sulfate with aqueous ammonia introduced by conduit 24; the contents are then discharged into evaporator J, in which part of the solvent is distilled off. After condensation of the solvent in condenser K, this solvent is returned to extraction column C and neutralizing vessel A through conduits 12 and 26.

The more concentrated solution of lactam in the organic solvent obtained as a bottom product in evaporator J is passed through conduit 13 into the top of extraction column L, where the solution is extracted with water fed in counter-current through conduit 14. From the top of column L, a solution of crude lactam in water is discharged through conduit 15 for further processing, while solvent freed of lactam is passed from the bottom of the column through conduit 16, if so required after purification in a conventional distilling apparatus (not shown), into extraction column F, where it is used to remove dissolved lactam from an ammonium-hydrogen-sulfate solution, after which the solvent which again contains lactam flows through conduit 18 into conduit 10.

The solution of ammonium hydrogen sulfate in water to be discharged from separator E is passed through conduit 19 into extraction column F, where it is freed of dissolved lactam and is then passed into evaporator G through conduit 21.

A concentrated solution is passed through conduit 21 into mixing vessel M, where it is combined with the melt discharged through conduit 11 and then supplied through conduit 22 to the conventional processing of the ammonium-hydrogen-sulfate melt (not shown). Evaporated water in evaporator G escapes through conduit 23.

Aqueous ammonia is fed to neutralizing vessel H through conduit 24, and an ammonium sulfate solution is discharged through conduit 25.

Not all of the solvent recycled need by passed through extraction column C; part of it may be passed directly into neutralizing vessel A through conduit 26.

The process of the present invention will be further illustrated by means of the following example. Unless otherwise indicated all parts and percentages are by weight.

EXAMPLE OF THE INVENTION

Using the equipment according to the FIGURE and as described above, a conversion mixture consisting of 1000 kg of ε-caprolactam and 1301 kg of sulfuric acid was passed into neutralizing vessel A through conduit 1, and 151 kg of $NH_3$ through conduit 2 per unit of time. In addition, 1030 kg of tetrachloroethane, together with 10 kg of lactam, are supplied to neutralization vessel A through conduit 4 and 1540 kg of tetrachloroethane through conduit 26.

The temperature in the neutralizing vessel was kept at 150°C. From the neutralizing vessel A, a mixture of reduced acidity flows through conduit 6 into separator B, where 2 layers are formed.

The upper layer consisting of the organic phase (2570 kg of $C_2H_2Cl_4$ in which 1000 kg of lactam and 434 kg of $H_2SO_4$ are dissolved) is passed through conduit 7 into the secondary neutralizing vessel D, which is also supplied with $NH_3$ (56 kg) through conduit 3, with water in the form of a condensate containing sulfuric acid (37 kg of $H_2SO_4$ and 693 kg of $H_2O$) through conduit 5, and with an ammonium-sulfate solution from neutralizing vessel H (101 kg of $(NH_4)_2SO_4$ and 167 kg of $H_2O$) through conduit 25.

The lower layer formed in separator B and consisting of a melt of ammonium hydrogen sulfate and a small amount of lactam is extracted in extraction column C with tetrachloroethane (1030 kg) supplied through conduit 12, after which an ammonium-hydrogen-sulfate melt (1018 kg) freed of lactam is discharged through conduit 11.

The contents of the secondary neutralizing vessel D flow through conduit 9 into separator E, where also two layers are formed; an organic phase (823 kg of lactam and 66 kg of $H_2SO_4$ in 2570 kg of $C_2H_2Cl_4$) containing a little water (about 1–2% by weight) is passed through conduit 10 into a neutralizing and separating vessel H, in which the sulfuric acid is removed by neutralization to ammonium sulfate, while at the same time a separation is effected between the neutralized solution of lactam in the organic solvent and the solution of ammonium sulfate in water formed in the neutralization, the latter solution, which still contains a little lactam, being passed through conduit 25 into mixing vessel D to recover this lactam.

The water layer formed in separator E totaling 1599 kg and composed of 177 kg of lactam, 553 kg of $NH_4HSO_4$, 9 kg of $H_2SO_4$ and 860 kg of $H_2O$, is passed through conduit 19 into extraction column F, where it is freed of lactam by extraction with the organic solvent $C_2H_2Cl_4$ (880 kg) supplied through conduit 17.

An ammonium hydrogen sulfate solution approximately 39% by weight of the salt (553 kg dissolved in 860 kg of water) is discharged from the top of column F through conduit 20. This solution is further concentrated in evaporator G and then combined in mixing vessel M with the melt discharged through conduit 11 to form an aqueous mass of ammonium hydrogen sulfate with a content of, for example, about 90% by weight.

An organic phase (177 kg of lactam, 9 kg of $H_2SO_4$ dissolved in 880 kg of $C_2H_2CL_4$) containing a little water (0.5–1% by weight) flows from the bottom of column F through conduit 18 and is neutralized in neutralizing vessel H together with the quantity discharged through conduit 10. The neutralized organic phase is passed into evaporating column J; from this column, an approximately 60% by weight solution of lactam in $C_2H_2Cl_4$ (in all 1667 kg) is discharged as bottom product through conduit 13, this lactam solution then being extracted in washing column L with water (2333 kg) fed in a counter-current direction through conduit 14. Through conduit 15, an approximately 30% by weight solution of lactam in water is discharged as the recovered product. The organic solvent freed of lactam and if so desired, after distillation, is reused by passing it into column F, for example, through conduit 16.

The organic solvent recovered as top product in column J is substantially recycled through conduit 12 to mixing vessel A and extraction column C; the rest (213 kg) is passed through conduit 17 to make up the amount of extracting agent required for column F.

Hence, the process according to the present invention makes it possible to recover lactam from a lactam-sulfuric acid mixture by extraction, while at the same time about two-thirds of the sulfuric acid present is converted into a melt of ammonium hydrogen sulfate and about one-third is converted into an approximately 39% by weight solution of ammonium hydrogen sulfate.

The melt and the solution so produced may be burned and the $SO_2$ then released may be reused for the production of sulfuric acid or oleum, so that the sulfuric acid or oleum used in the preparation of lactam is recycled and the undesirable production of ammonium sulfate is avoided.

Before the solution of ammonium hydrogen sulfate is passed on to be burned, it is desirable, in order to obtain an $SO_2/H_2O$ ratio in the combustion gases that is suitable for the preparation of sulfuric acid, to first concentrate the solution by evaporation to a content of, for example, about 80–90% by weight.

What is claimed is:

1. In a process for the recovery of lactam from a mixture of at least one lactam having 4 to 12 carbon atoms and sulfuric acid, said process comprising neutralizing said sulfuric acid in said mixture to ammonium hydrogen sulfate at a temperature of at least about 110°C in the presence of an amount of at least one organic solvent for said lactam sufficient to dissolve said lactam, said solvent being inert to sulfuric acid at a temperature of 150°C, with at least one neutralizing agent selected from the group consisting of ammonia, ammonium sulfate, and triammonium hydrogen sulfate, to produce a melt of ammonium hydrogen sulfate and a solution of lactam in said organic solvent, said solution also containing free sulfuric acid, and recovering the lactam from said solution, the improvement comprising adding water to the said solution of lactam concurrently with an amount of said neutralizing agent, thereby forming a solution of ammonium hydrogen sulfate, and thereafter separating the thus formed salt solution from the remaining solution of lactam.

2. The process according to claim 1 wherein the added water is a condensate containing a minor amount of sulfuric acid.

3. The process according to claim 1 wherein the ammonium hydrogen sulfate solution so produced is concentrated by evaporation to a salt content of at least about 80% by weight, then discharged.

* * * * *